US012809912B2

(12) United States Patent
Doi et al.

(10) Patent No.: US 12,809,912 B2
(45) Date of Patent: Nov. 24, 2026

(54) INFORMATION PROCESSING DEVICE, INFORMATION PROCESSING METHOD, AND NON-TRANSITORY COMPUTER READABLE STORAGE MEDIUM

(71) Applicant: Yahoo Japan Corporation, Tokyo (JP)

(72) Inventors: Kenji Doi, Tokyo (JP); Masajiro Iwasaki, Tokyo (JP); Shuhei Nishimura, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 106 days.

(21) Appl. No.: 17/690,902

(22) Filed: Mar. 9, 2022

(65) Prior Publication Data

US 2022/0414738 A1 Dec. 29, 2022

(30) Foreign Application Priority Data

Jun. 17, 2021 (JP) ................................ 2021-101057

(51) Int. Cl.
*G06F 16/532* (2019.01)
*G06F 16/583* (2019.01)
*G06Q 30/0601* (2023.01)

(52) U.S. Cl.
CPC .......... *G06F 16/532* (2019.01); *G06F 16/583* (2019.01); *G06Q 30/0627* (2013.01)

(58) Field of Classification Search
CPC .. G06F 16/583; G06F 16/5838; G06F 16/532; G06F 18/22; G06Q 30/0643; G06Q 30/0627; G06Q 30/0601–0645; G06Q 30/0629
USPC ...................................... 705/26.3, 26.1–27.2
See application file for complete search history.

(56) References Cited

U.S. PATENT DOCUMENTS

2005/0281480 A1* 12/2005 Baldwin ............... G06T 11/001 358/1.9
2014/0089295 A1* 3/2014 Becherer ............. G06F 16/3328 707/769
2016/0132498 A1* 5/2016 Wang ........................ G06T 7/90 382/165

(Continued)

FOREIGN PATENT DOCUMENTS

JP 6403861 B1 10/2018

OTHER PUBLICATIONS

Ran Yi, Mengfei Xia, Young-Jin Liu, Yu-Kun Lai, Paul L. Rosin, "Line Drawings for Face Portraits from Photos Using Global and Local Structure Based GANs, " 2020, IEEE Transactions on Pattern Analysis and Machine Intelligence, vol. 43, Issue 10, 3462-3475 (Year: 2020).*

*Primary Examiner* — Anna Mae Mitros
(74) *Attorney, Agent, or Firm* — Procopio, Cory, Hargreaves & Savitch LLP

(57) ABSTRACT

An information processing device according to the present application includes an obtaining unit, a reception unit, and a provision unit. The obtaining unit obtains a base image, the base image being an image that includes a transaction target specified by a user. The reception unit receives editing performed by the user on an illustration image that includes an illustration-prepared transaction target obtained by preparing an illustration of a transaction target included in the base image. The provision unit provides an edited illustration image to a search server that conducts an image search, the edited illustration image being the illustration image that has been edited by the user.

15 Claims, 5 Drawing Sheets

(56) References Cited

U.S. PATENT DOCUMENTS

| | | | | |
|---|---|---|---|---|
| 2019/0205962 | A1* | 7/2019 | Piramuthu | G06F 16/9035 |
| 2020/0073968 | A1* | 3/2020 | Zhang | G06F 16/137 |
| 2020/0356591 | A1* | 11/2020 | Yada | G06F 16/5862 |
| 2022/0172123 | A1* | 6/2022 | Chow | G06F 16/242 |

* cited by examiner

141

| MODEL ID | PURPOSE | MODEL DATA | ... |
|---|---|---|---|
| M1 | PREPARE ILLUSTRATION | MDT1 | ... |
| ... | ... | ... | ... |

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2021-101057 filed in Japan on Jun. 17, 2021.

BACKGROUND OF THE INVENTION

1. Field of the Invention

The present invention relates to an information processing device, an information processing method, and an information processing program.

2. Description of the Related Art

Conventionally, a technology for searching for information that corresponds to information that has been input as a search query is known. As an example of such a technology, a technology for conducting an image search by using an image that has been generated from a received handwritten image has been provided (for example, Patent Document 1).

However, the conventional technology described above has room for improvements. For example, in the conventional technology described above, a user starts handwriting from a blank state, and it cannot necessarily be said that usability is high. Therefore, it is requested that usability be increased, and a search desired by a user be facilitated.

SUMMARY OF THE INVENTION

According to one aspect of an embodiment, an information processing device includes an obtaining unit that obtains a base image, the base image being an image that includes a transaction target specified by a user; a reception unit that receives editing performed by the user on an illustration image that includes an illustration-prepared transaction target obtained by preparing an illustration of a transaction target included in the base image; and a provision unit that provides an edited illustration image to a search server that conducts an image search, the edited illustration image being the illustration image that has been edited by the user.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes for carrying out an information processing device, an information processing method, and an information processing program according to the present application (hereinafter referred to as "embodiments") are described in detail below with reference to the drawings. Note that the information processing device, the information processing method, and the information processing program according to the present application are not to be limited to these embodiments. In addition, in each of the embodiments described below, the same portion is denoted by the same reference sign, and a duplicate description is omitted.

Embodiments

1. Information Processing

Figure 1:
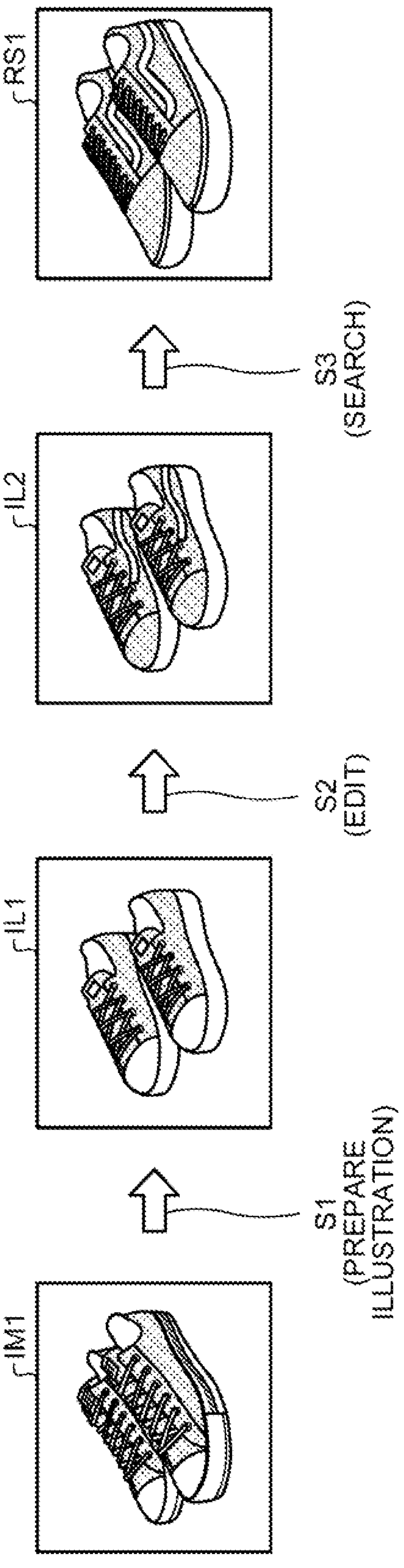
FIG. 1 is a diagram illustrating an example of information processing according to an embodiment.
Figure 2:
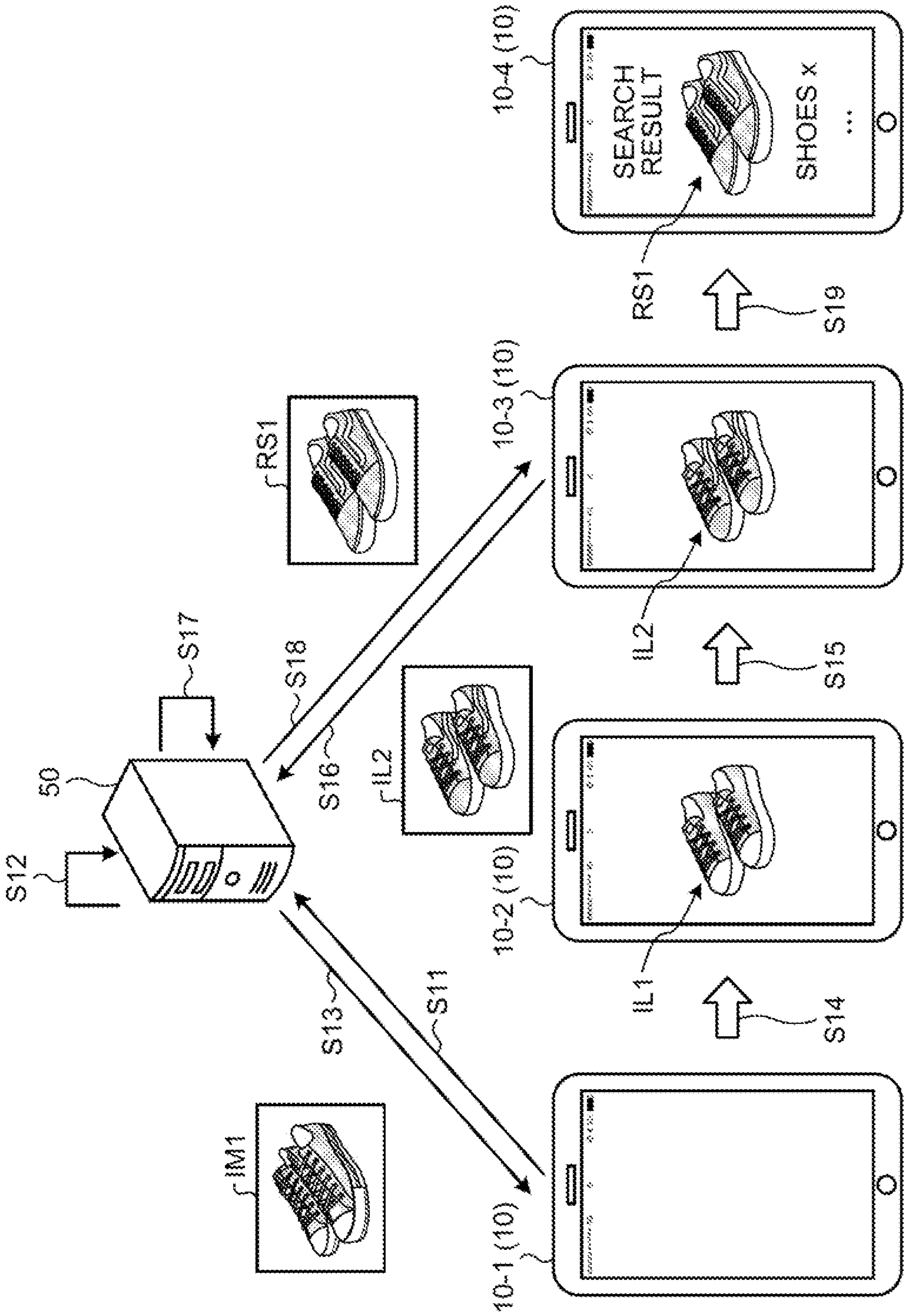
FIG. 2 is a diagram illustrating an example of information processing according to an embodiment.

An example of information processing according to an embodiment is described with reference to FIGS. 1 and 2. FIGS. 1 and 2 are diagrams illustrating an example of information processing according to an embodiment. Specifically, FIG. 1 is a diagram illustrating the outline of information processing performed by an information processing system 1 (see FIG. 3). In addition, FIG. 2 is a diagram illustrating details of the information processing performed by the information processing system 1, including communication between a terminal device 10 and a search server 50 that are included in the information processing system 1.

1-1. Configuration of Information Processing System

Figure 3:
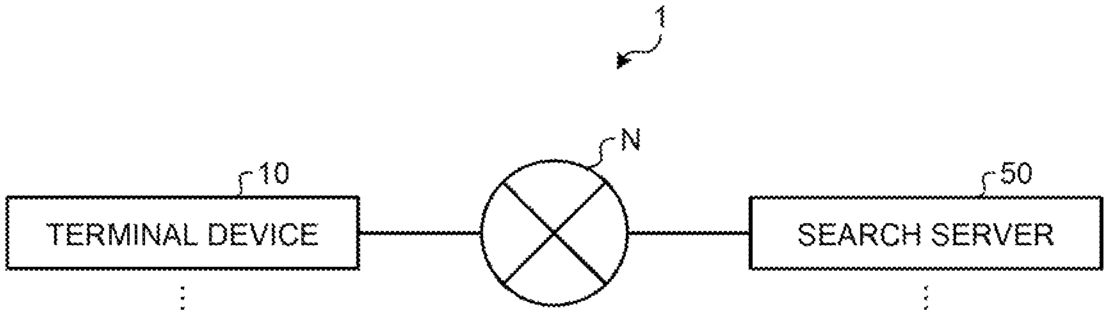
FIG. 3 is a diagram illustrating an example of a configuration of an information processing system according to an embodiment.

First, prior to the description of FIGS. 1 and 2, a configuration of the information processing system 3 illustrated in FIG. 3 is described. As illustrated in FIG. 3, the information processing system 1 includes the terminal device 10 and the search server 50. The terminal device 10 and the search server 50 are communicably connected via a predetermined network N by wire or wirelessly. FIG. 3 is a diagram illustrating an example of a configuration of an information processing system according to an embodiment. Note that the information processing system 1 illustrated in FIG. 3 may include a plurality of terminal devices 10 or a plurality of search servers 50.

The terminal device 10 is an information processing device (a computer) that is used by a user. The terminal device 10 is an information processing device that performs information processing, and is implemented, for example, by a smart device such as a smartphone or a tablet. For example, the terminal device 10 is a portable terminal device that can perform communication with an arbitrary server device via a wireless communication network such as 3rd generation (3G) or long term evolution (LTE). Note that the terminal device 10 is not limited to the smart device, and may be an information processing device such as a desktop personal computer (PC) or a laptop PC. The terminal device 10 is a display device that displays information relating to a variety of applications (also referred to as "apps.") on a screen.

Here, the terminal device 10 has a function of receiving various inputs from a user. For example, the terminal device 10 includes a touch panel that receives an input performed by a user, and has a function of receiving a user's operation to edit a displayed image by using a finger or a stylus.

In addition, the terminal device 10 may have a function of changing the style of an image. For example, the terminal device 10 has a function of converting the style of an image that is a taken photograph into an illustration. In this case, the terminal device 10 performs processing of generating an image having the form of an illustration (also referred to as an "illustration image") from a photograph (an image) obtained by imaging a transaction target (also referred to as "illustration preparation processing"). The transaction target described here may be any type of target that can be a target for transaction, such as products or services, and examples include products, services, or the like that have been exhibited in a cybermall. Description is provided below by using sneakers (shoes) serving as a product, as an example of a transaction target. However, the transaction target is not limited to sneakers, and may be any type of target that can be a target for transaction, such as the layout of a real estate property.

Note that a variety of technologies may be used in illustration preparation processing. For example, the terminal device 10 may perform illustration preparation processing by using a convolution neural network (CNN) based technique such as cycle generative adversarial network (GAN). In addition, for example, the terminal device 10 may perform illustration preparation processing by using the technology described in Patent Document 1 described above.

The example described below describes, as an example, a case where the terminal device 10 generates an illustration image from a photograph (an image) by using a generation model M1 for generating an illustration image obtained by preparing an illustration of an image. For example, the generation model M1 is learned by using a CNN-based technique such as CycleGAN, and is a model of outputting an image (an illustration image) obtained by preparing an illustration of an input image. For example, by using a technique such as CycleGAN, not only conversion from a photograph into an illustration but also inverse conversion from an illustration to a photograph can be performed. In this case, for example, the information processing system 1 can restore an edited illustration to a photograph (a photographic image) (perform inverse conversion), and then can search for a generated index by using the photographic image after inverse conversion). Note that the description above is merely an example, and the generation model M1 may be learned by using an arbitrary technique.

Note that illustration preparation processing may be performed by a device that is different from the terminal device 10. For example, the information processing system 1 may include an image processing server that performs illustration preparation processing. In this case, for example, the terminal device 10 transmits, to the image processing server, an image for which an illustration is to be prepared, and the image processing server that has received the image generates an illustration image obtained by preparing an illustration of the image. For example, the image processing server generates the illustration image by using the generation model M1 that has been learned by using a CNN-based technique such as CycleGAN. Then, the illustration image that has been generated by the image processing server may be transmitted to the terminal device 10, and therefore the terminal device 10 may obtain the illustration image.

The search server 50 is a computer that provides search services to a user who uses the terminal device 10. The search server 50 is an information processing device that conducts an image search, and is implemented, for example, by a server device, a cloud system, or the like. For example, upon receipt of an image serving as a search query (also referred to as a "query image"), the search server 50 performs search processing for searching for an image that is similar to the query image from among various images serving as search targets, and provides a search result. Specifically, upon receipt of an illustration image as a query image (also referred to as a "query illustration") from the terminal device 10, the search server 50 performs search processing on the basis of the illustration image, and provides a search result. As described above, the search server 50 may perform search processing by using an index obtained by preparing an illustration of a transaction target, such as a product, that serves as a search target, and may provide a search result. Note that the description above is merely an example, and the search server 50 may use an index that has been generated by using a product image that is an original photograph with no change. In this case, as a search index (an index), a plurality of indices, including an index (a first index) that has been generated by using a product image that is an original photograph with no change and an index (a second index) that has been generated by using an image after illustration preparation, may be used. In this case, the search server 50 may perform search processing by using any of the plurality of indices according to a style after conversion, and may provide a search result. For example, the search server 50 may perform search processing by using any of the first index and the second index according to a style (line drawing, an impressionist style, or the like) after conversion, and may provide a search result. For example, in a case where a search is conducted by using an image after conversion, the search server 50 may perform search processing by using the second index, and may provide a search result. In addition, for example, in a case where a search is conducted after restoration to a photograph, the search server 50 may perform search processing by using the first index, and may provide a search result.

The search server 50 performs search processing for each transaction target exhibited in a cybermall, by using an image (also referred to as a "registered illustration image") obtained by preparing an illustration of an image (also referred to as a "registered image") that has been registered as an image indicating each of the transaction targets. For example, a search is conducted for a transaction target for which a registered illustration image is similar to a query image (a query illustration) from among transaction targets exhibited in a cybermall, and information relating to the transaction target for which the registered illustration image is similar to the query image (the query illustration) is extracted as a search result.

In addition, for example, the search server 50 provides a registered image or price of the transaction target that has been extracted as the search result, information relating to a store that sells the transaction target in the cybermall, or the like. As described above, the search server 50 provides information relating to a transaction target for which a registered illustration image is similar to an illustration image serving as a query image. Note that the search server 50 may generate rankings that correspond to price, selling history, or a degree of similarity between a registered image and a query image of a transaction target, and may provide the generated rankings as a search result.

The description above is merely an example, and the search server 50 may provide a search result on the basis of a relationship of similarity between a registered image and a query image without using a registered illustration image. In this case, the search server 50 searches for a transaction target for which a registered image is similar to a query image from among transaction targets exhibited in a cyber-mall, and provides, as a search result, information relating to the transaction target for which the registered image is similar to the query image.

1-2. Outline of Processing

Return to FIG. 1. The outline of information processing will be described from now. Processing that is performed mainly by the information processing system 1 in the description of FIG. 1 may be performed by any of devices included in the information processing system 1.

First, the information processing system 1 obtains an image serving as a basis (also referred to as a "base image"). For example, the information processing system 1 searches for a product serving as a basis, and obtains, as a base image, an image including the product. In the example of FIG. 1, the information processing system 1 obtains a base image IM1 including red sneakers (also referred to as a "transaction target Y") that are a product serving as a basis. Note that in FIGS. 1 and 2, a red portion (region) in an image is illustrated using hatching for the sake of display. In other words, a case is indicated where the red sneakers (the transaction target Y) included in the base image IM1 are sneakers in which a toe portion and a bottom are white and the other portion is red.

Then, the information processing system 1 prepares an illustration of the base image (Step S1). For example, the information processing system 1 prepares an illustration of the base image by using a CNN-based technique such as CycleGAN. The information processing system 1 generates an illustration image IL1 from the base image IM1 by using the generation model M1. The illustration image IL1 indicates an illustration of sneakers in which a toe portion and a bottom are white and the other portion is red, similarly to the base image IM1. In other words, the illustration image IL1 includes red sneakers in the form of an illustration (also referred to as an "illustration-prepared transaction target IY) obtained by preparing an illustration of the red sneakers (the transaction target Y).

Then, the information processing system 1 receives editing performed by a user on the illustration image (Step S2). For example, the user checks the illustration-prepared transaction target IY, and edits the illustration-prepared transaction target IY according to the user's taste. In FIG. 1, the user performs editing for changing the color of the toe portion to red and adding a mark on a white wavy line to a side portion. The information processing system 1 generates an edited illustration image IL2 obtained by editing the illustration-prepared transaction target IY in response to editing performed by the user. The edited illustration image IL2 indicates an illustration of sneakers in which the mark on the wavy line that has been added to the side portion and a bottom are white and the other portion is red.

Then, the information processing system 1 performs search processing by using the edited illustration image (Step S3). Note that, as described above, for example, the information processing system 1 may perform inverse conversion from the edited illustration image to a photograph, and may perform conversion processing (on an index for a photograph). The information processing system 1 searches for a transaction target that is similar to the edited illustration image. For example, the information processing system 1 prepares a search index of an illustration-prepared transaction target, and searches for a real product by using an illustration. The information processing system 1 extracts the red sneakers indicated in a similar image RS1, as a transaction target that is similar to the edited illustration image IL2. The red sneakers indicated in the similar image RS1 are red sneakers that has a red toe portion and has a white mark on a wavy line in a side portion, and are a transaction target that is similar to the illustration of the sneakers in the edited illustration image IL2.

For example, in some cases, a user has an image of a transaction target, such as a desired product, in their mind, but has difficulty in conducting a search by using a keyword. In such cases, if a search can be conducted by using an illustration, convenience for a user is improved. On the other hand, it is not easy for a user to draw an illustration from a blank state, and there is a problem in which a large burden is imposed on the user. In view of this, the information processing system 1 performs processing of editing an illustration and conducting a search by using the edited illustration. For example, the information processing system 1 converts a transaction target, such as a product (for example, sneakers) serving as a basis, into an illustration, and receives editing performed by a user on the illustration. Then, the information processing system 1 searches for a transaction target having a similar appearance on the basis of the illustration edited by the user. By doing this, the information processing system 1 can facilitate a search desired by the user.

1-3. Examples of Information Processing

From now, details of information processing performed by the information processing system 1, including communication between the terminal device 10 and the search server 50 that are included in the information processing system 1, will be described with reference to FIG. 2. In FIG. 2, the terminal device 10 is described as a terminal device 10-1, a terminal device 10-2, a terminal device 10-3, or a terminal device 10-4, according to a change in the content of a display in the terminal device 10. Note that the terminal device 10-1, the terminal device 10-2, the terminal device 10-3, and the terminal device 10-4 are the same terminal device 10. In addition, in the description below, in a case where description is provided without particularly distinguishing the terminal device 10-1, the terminal device 10-2, the terminal device 10-3, and the terminal device 10-4 from each other, the term "terminal device 10" is used.

First, the terminal device 10-1 requests, of the search server 50, an image (a base image) including a transaction target specified by a user (Step S11). The terminal device 10-1 transmits, to the search server 50, the keyword "red sneakers" that has been input by the user, and therefore the terminal device 10-1 requests that the search server 50 provide a base image including red sneakers.

Note that FIG. 2 illustrates a case where the terminal device 10 obtains the base image IM1 from the search server 50, for the sake of description. However, the terminal device 10 may obtain the base image IM1 from a device other than the search server 50. For example, the terminal device 10 may obtain the base image IM1 from a device other than the search server 50 (for example, an image providing device or the like), or may use, as the base image IM1, an image indicating a transaction target imaged by the local device.

The search server 50 extracts an image that corresponds to a request from the terminal device 10 (Step S12). The search server 50 extracts an image including red sneakers as the base image IM1 from registered images. Then, the search server 50 transmits the extracted base image IM1 to the terminal device 10 (Step S13). Note that in a case where a plurality of images including red sneakers has been extracted, the search server 50 may transmit the plurality of images as base images to the terminal device 10.

The terminal device 10 that has received the base image IM1 from the search server 50 performs illustration preparation processing on the base image IM1 (Step S14). The terminal device 10 inputs the base image IM1 to the generation model M1, and causes the generation model M1 to output an image obtained by preparing an illustration of the base image IM1, and therefore the terminal device 10 performs illustration preparation processing. The terminal device 10 generates an illustration image IL1 obtained by preparing an illustration of the base image IM1. Then, as illustrated in FIG. 2, the terminal device 10-2 displays the illustration image IL1.

Then, the terminal device 10-2 that is displaying the illustration image IL1 receives editing performed by a user on the illustration image IL1 (Step S15). The terminal device 10 receives editing performed by the user for changing the color of a toe portion in the illustration image IL1 to red and adding a mark on a white wavy line to a side portion. Then, as illustrated in FIG. 2, the terminal device 10-3 displays an edited illustration image IL2 in which editing performed by the user on the illustration image IL1 has been reflected.

The user who has checked the edited illustration image IL2 displayed in the terminal device 10-3 may perform further editing as needed. In FIG. 2, the edited illustration image IL2 indicate a desired aspect, and therefore the user performs, on the terminal device 10, an operation for performing search processing using the edited illustration image IL2. For example, the user selects a search button that is displayed together with the edited illustration image IL2 in the terminal device 10-3, and therefore the user performs, on the terminal device 10, the operation for performing search processing using the edited illustration image IL2.

The terminal device 10-3 that has received the operation for performing search processing using the edited illustration image IL2 requests that the search server 50 perform search processing using the edited illustration image IL2 (Step S16). The terminal device 10-3 provides the edited illustration image IL2 to the search server 50. For example, the terminal device 10-3 transmits the edited illustration image IL2 to the search server 50, and therefore the terminal device 10-3 requests that the search server 50 perform search processing using the edited illustration image IL2.

The search server 50 performs search processing using the edited illustration image IL2 (Step S17). The search server 50 searches for a transaction target that is similar to red sneakers after editing that are included in the edited illustration image IL2. The search server 50 performs search processing to extract red sneakers (also referred to as "shoes x"), as indicated in a similar image RS1, as a transaction target that is similar to the edited illustration image IL2. For example, the search server 50 extracts a similar image RS1 including red sneakers (shoes x) that have a red toe portion and have a white mark on a wavy line in a side portion.

Then, the search server 50 provides a search result to the terminal device 10 (Step S18). The search server 50 transmits the similar image RS1 or information relating to the shoes x (the transaction target) indicated in the similar image RS1 as a search result to the terminal device 10.

Figure 4:
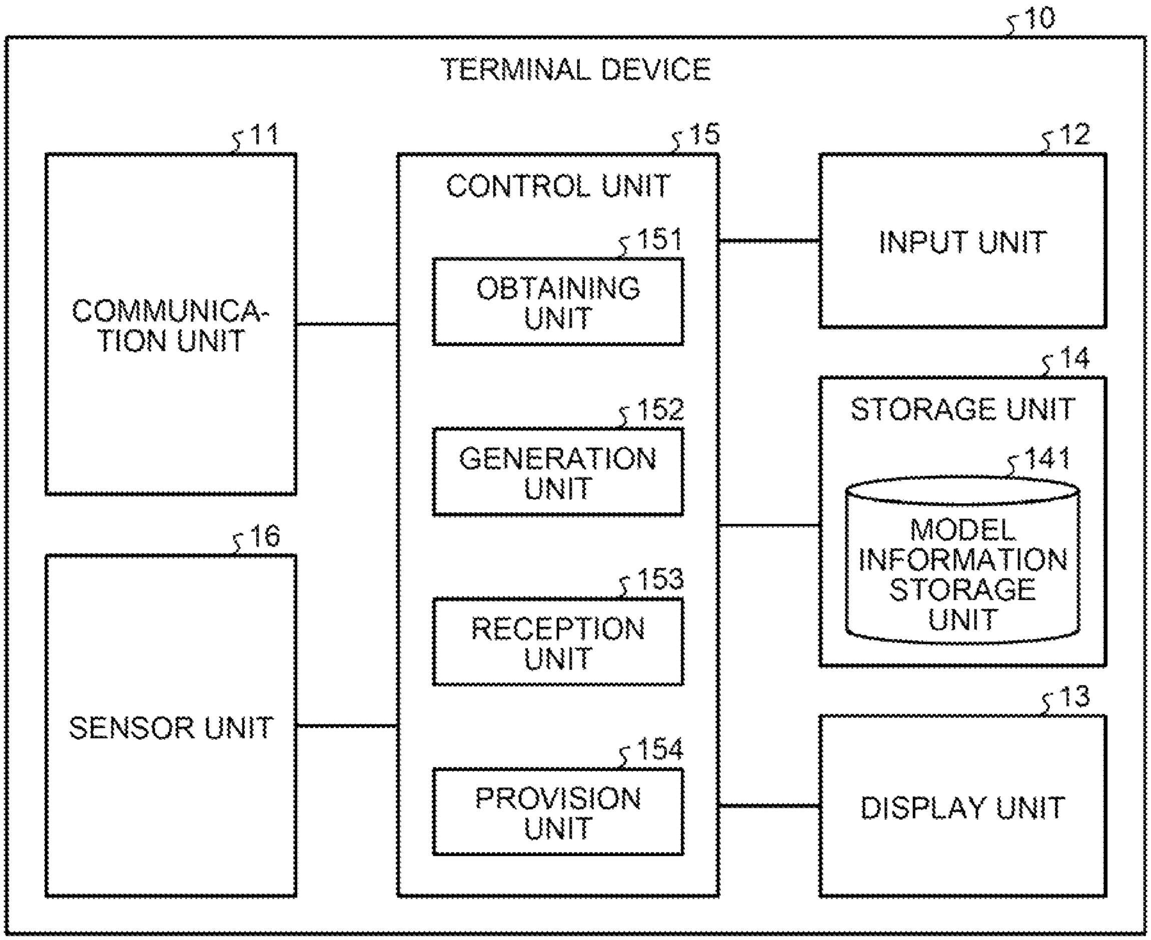
FIG. 4 is a diagram illustrating an example of a configuration of a terminal device according to an embodiment.

The terminal device 10 that has received the search result from the search server 50 displays the search result (Step S19). In FIG. 4, the terminal device 10-4 displays information relating to the shoes x, such as the similar image RS1, as the search result.

1-4. Others

The description above is merely an example, and processing performed by the information processing system 1 is not limited to the above. Examples of processing performed by the information processing system 1 are described below.

1-4-1. Edit

The example described above indicates a case where a user performs editing for changing the color of an illustration image. However, a target to be edited is not limited to color, and any kind of element may be changed if an illustration-prepared transaction target is edited.

For example, the information processing system 1 may receive editing performed by a user for changing a shape of an illustration-prepared transaction target. In this case, the terminal device 10 receives a change in a shape performed by the user on the illustration-prepared transaction target. Then, the terminal device 10 provides the search server 50 with an edited illustration image in which the shape of the illustration-prepared transaction target has been changed by the user. By doing this, the search server 50 performs search processing by using the edited illustration image in which the shape has been changed, and transmits a result of search processing to the terminal device 10. For example, in the case of FIG. 2, the user may perform editing for changing low-top sneakers included in the illustration image IL1 to high-top sneakers. The information processing system 1 performs search processing by using an edited illustration-prepared transaction target in which the user has performed a change to high-top sneakers.

In addition, for example, the information processing system 1 may receive editing performed by the user for changing a pattern of an illustration-prepared transaction target. In this case, the terminal device 10 receives a change in a pattern performed by the user on the illustration-prepared transaction target. Then, the terminal device 10 provides the search server 50 with an edited illustration image in which the pattern of the illustration-prepared transaction target has been changed by the user. By doing this, the search server 50 performs search processing by using the edited illustration image in which the pattern has been changed, and transmits a result of search processing to the terminal device 10. For example, in the case of FIG. 2, the user may perform editing for changing sneakers having a single red pattern included in the illustration image IL1 to sneakers having a pattern such as camouflage. The information processing system 1 performs search processing by using an edited illustration-prepared transaction target in which the user has performed a change to a camouflage pattern.

1-4-2. Base Image

The example described above indicates a case where a user specifies a transaction target and its color by using the keyword "red sneakers", and the terminal device 10 obtains a base image of a red transaction target "sneakers" that has been specified by the user. However, specification performed by a user is not limited to the above. For example, a user may only specify a transaction target by using the keyword "sneakers".

In addition, a user may specify a transaction target and its shape, and the terminal device 10 may obtain a base image of a transaction target having the shape specified by the user. For example, a user may specify a transaction target and its shape by using the keyword "high-top sneakers", and the terminal device 10 may obtain a base image of the high-top sneakers specified by the user.

In addition, a user may specify a transaction target and its pattern, and the terminal device 10 may obtain a base image of a transaction target having the pattern specified by the user. For example, a user may specify a transaction target and its pattern by using the keyword "plaid sneakers", and the terminal device 10 may obtain a base image of the plaid sneakers specified by the user.

Note that the description above is merely an example, and the terminal device 10 may obtain a variety of base images that correspond to specification performed by a user. The terminal device 10 may obtains a variety of base images that correspond to specification of a combination of a transaction target and at least one of color, a shape, and a pattern of the transaction target. For example, in a case where a user has specified the keyword "red high-top sneakers", the terminal device 10 may obtain a base image of the red high-top sneakers specified by the user.

1-4-3. Display

The example described above indicates a case where the terminal device 10 displays an illustration image obtained by preparing an illustration of a base image, and receives editing performed by a user on the displayed illustration image. However, an aspect of a display in the terminal device 10 is not limited to the above. For example, the terminal device 10 may display a base image, and may receive editing performed by a user on a displayed illustration image. Then, the terminal device 10 may reflect, in an illustration image, editing performed by a user on the displayed base image. In the case of FIG. 2, the terminal device 10 may display the base image IM1, and may reflect, in the illustration image IL1, editing performed by a user on the base image IM1. For example, in a case where a user has changed the color of toes of sneakers included in the base image IM1 to blue, the terminal device 10 changes the color of toes of sneakers included in the illustration image IL1 to blue. In this case, the information processing system 1 can generate an illustration image serving as a search query while causing the user to imagine a real image.

1-4-4. Image

The example described above indicates a case where an illustration of a base image is prepared with no change, but the information processing system 1 may generate a variety of images by using a variety of pieces of information. In other words, the information processing system 1 may generate not only an illustration image but also images having a variety of styles on the basis of a base image. Examples in this point are described below. Note that it is sufficient if a variety of conventional technologies are appropriately used to convert the style of an image, and a detailed description is omitted.

For example, the information processing system 1 may generate an illustration image obtained by removing color from a base image. In other words, the information processing system 1 may generate a line drawing from a base image. In this case, the information processing system 1 may generate an illustration image obtained by removing color from a base image, by using a model of receiving an image as an input, and outputting an illustration image obtained by removing color from the image.

For example, the information processing system 1 may generate a converted image obtained by converting the style of a base image into vague drawing such as the impressionists. In this case, the information processing system 1 may generate a converted image obtained by converting the style of a base image into an impressionist style, by using a model of receiving an image as an input, and outputting a converted image obtained by converting the style of the image into an impressionist style.

In addition, for example, the information processing system 1 may generate a converted image obtained by converting the style of a base image into clear drawing such as the realists. In this case, the information processing system 1 may generate a converted image obtained by converting the style of a base image into a realist style, by using a model of receiving an image as an input, and outputting a converted image obtained by converting the style of the image into a realist style.

1-4-5. Input Model

The example described above indicates an example of receiving a single base image as an input, but in the generation model M1, a plurality of pieces of information may be received as an input. For example, in the generation model M1, a plurality of images may be received as an input, and a single image may be output.

For example, in the generation model M1, a plurality of images that corresponds to respective plural elements, including a first base image that corresponds to a shape and a second base image that corresponds to color, may be received as an input, and an illustration image having characteristics of the respective elements may be output. In this case, in the generation model M1, an illustration image in which the color of the second base image has been reflected in the shape of a transaction target in the first image is output. As described above, in the generation model M1, an image obtained by mixing characteristics of respective elements of a plurality of images is output. Note that the description above is merely an example, and an image obtained by engaging characteristics of a plurality of images with each other may be generated by using a variety of techniques. For example, the information processing system 1 may achieve this by adding color to a CycleGAN base.

1-4-6. Multi-Viewpoint Image

For example, in the generation model M1, a base image may be received as an input, and a multi-viewpoint image that corresponds to the base image may be output. For example, in the generation model M1, a base image may be received as an input, and a three-dimensional image of a transaction target included in the base image may be output. In this case, a user may edit a desired image in the three-dimensional image of the transaction image. Then, the information processing system 1 may perform search processing by using an image edited by the user as a query image. Note that the description above is merely an example, and the information processing system 1 may perform various types of processing by using a multi-viewpoint image or a three-dimensional image. For example, the information processing system 1 may estimate a three-dimensional image on the basis of an image selected by a user, and may display an illustration-prepared image by using cartoon shading. Then, the information processing system 1 may modify the image on the basis of editing performed by the user, and may perform search processing.

1-4-7. Repeating Processing

The information processing system 1 may repeating processing using a search result. In the example of FIG. 2, the information processing system 1 may perform search processing by using an illustration image obtained by preparing an illustration of shoes x indicated by the similar image RS1 serving as a search result. In this case, the information processing system 1 receives editing performed by a user on the illustration image obtained by preparing an illustration of shoes x. Then, the information processing system 1 performs search processing by using the illustration image edited by the user, and provides a search result to the user.

The information processing system 1 may perform repeating processing until a user obtains a desired search result. In this case, the terminal device 10 displays a search result and a button (a re-search button) for issuing an instruction to conduct a search using the search result, and in a case where a user has selected the re-search button, the terminal device 10 prepares an illustration of an image indicating the displayed search result, and receives editing performed by the user.

Note that the description above is merely an example, and any aspect may be employed if repeating processing using a search result can be performed. In addition, the information processing system 1 may perform various types of processing by using various types of information. The information processing system 1 may use a result of a user's selection (a result of clicking) in response to search processing.

2. Configuration of Terminal Device

Next, a configuration of the terminal device 10 according to an embodiment is described with reference to FIG. 4. FIG. 4 is a diagram illustrating an example of a configuration of a terminal device according to an embodiment. As illustrated in FIG. 4, the terminal device 10 includes a communication unit 11, an input unit 12, a display unit 13, a storage unit 14, a control unit 15, and a sensor unit 16. Note that the terminal device 10 includes a sound output unit, such as a speaker, that outputs sound, but illustration is omitted. For example, the sound output unit outputs sound that corresponds to information displayed on the display unit 13. In addition, the terminal device 10 includes a sound input unit that is a microphone, and may receive powerful to a user using sound.

Communication Unit 11

The communication unit 11 is implemented, for example, by a communication circuit or the like. Then, the communication unit 11 is connected to a not-illustrated predetermined communication network by wire or wirelessly, and transmits or receives information to/from an external information processing device. For example, the communication unit 11 is connected to a not-illustrated predetermined communication network by wire or wirelessly, and transmits or receives information to/from the search server 50.

Input Unit 12

Various operations are input to the input unit 12 from a user. For example, the input unit 12 may receive various operations from a user via a display surface (for example, the display unit 13) by using a touch panel function. In addition, the input unit 12 may receive various operations from a button provided in the terminal device 10, or a keyboard or a mouse that is connected to the terminal device 10.

The input unit 12 receives various operations from a user via a display screen of a tablet terminal or the like by using a touch panel function implemented by various sensors included in the sensor unit 16. In other words, the input unit 12 receives various operations from a user via the display unit 13 of the terminal device 10. For example, the input unit 12 receives a user's operation, such as a specification operation, via the display unit 13 of the terminal device 10. Stated another way, the input unit 12 functions as a reception unit that receives a user's operation by using a touch panel function. Note that as a scheme in which the input unit 12 senses a user's operation, a capacitance scheme is principally employed in a tablet terminal, but any scheme, such as a resistive film scheme, a surface acoustic wave scheme, an infrared scheme, or an electromagnetic induction scheme serving as another sensing scheme, may be employed if a user's operation can be sensed and a touch panel function can be implemented. In addition, in a case where the terminal device 10 is provided with a button, or is connected to a keyboard or a mouse, the terminal device 10 may include an input unit that also receives an operation using the button or the like.

Display Unit 13

The display unit 13 is a display screen that is implemented, for example, by a liquid crystal display, an organic electro-luminescence (EL) display, or the like in a tablet terminal or the like, and is a display device that displays various types of information. In other words, the terminal device 10 receives an input from a user by using the display screen serving as the display unit 13, and also performs an output to the user.

Storage Unit 14

The storage unit 14 is implemented, for example, by a semiconductor memory element such as a random access memory (RAM) or a flash memory, or a storage device such as a hard disk or an optical disk. The storage unit 14 stores, for example, information relating to an application (for example, a home application) that has been installed in the terminal device 10, such as a program. In addition, the storage unit 14 according to an embodiment includes a model information storage unit 141, as illustrated in FIG. 4.

Model Information Storage Unit 141

Figures 5, 6:
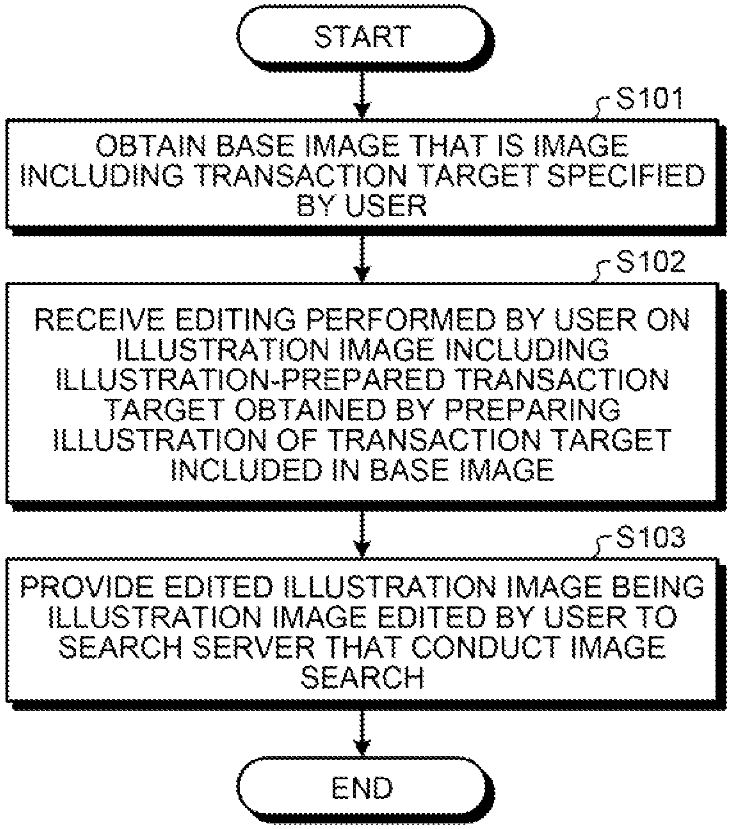
FIG. 5 is a diagram illustrating an example of a model information storage unit according to an embodiment.
FIG. 6 is a flowchart illustrating an example of information processing according to an embodiment.

The model information storage unit 141 according to an embodiment stores information relating to a model. For example, a model information storage unit 122 stores information (model data) of a learned model (a model) that has been learned (generated) by performing learning processing. FIG. 6 is a diagram illustrating an example of a model information storage unit according to a first embodiment of the present disclosure. In FIG. 6, an example of the model information storage unit 122 according to the first embodiment is illustrated. In the example illustrated in FIG. 6, the model information storage unit 122 includes items, "model ID", "purpose", "model data", and the like.

"Model ID" indicates identification information that identifies a model. "Purpose" indicates the purpose of a corresponding model. "Model data" indicates data of a model. FIG. 6 or the like illustrates an example where conceptual information such as "MDT1" is stored in "model data". However, in practice, various types of information that configure a model, such as information relating to a configuration of a model (a network configuration) or information relating to a parameter, are included. For example, "model data" includes information including a node in each layer of a network, a function to be employed by each of the nodes, a connection relationship between the nodes, and a connection coefficient to be set for connection between the nodes.

The example illustrated in FIG. 6 indicates that the purpose of a model identified by the model ID "M1" (a generation model M1) is "illustration preparation". In other words, it is indicated that the generation model M1 is a model of outputting image data obtained by preparing an illustration of input image data. In addition, it is indicated that model data of the generation model M1 is model data MDT1.

Note that the model information storage unit 122 is not limited to the above, and may store various types of information according to purposes.

Control Unit 15

The control unit 15 is a controller, and is implemented, for example, by causing a central processing unit (CPU), a micro processing unit (MPU), a graphics processing unit (GPU), or the like to execute various programs stored in a storage device such as the storage unit 14 in the terminal device 10 by using the RAM as a work area. For example, the various programs include a program of an application (for example, a home application) that performs information processing. In addition, the control unit 15 is a controller, and is implemented, for example, by an integrated circuit such as an application specific integrated circuit (ASIC) or a field programmable gate array (FPGA).

As illustrated in FIG. 4, the control unit 15 includes an obtaining unit 151, a generation unit 152, a reception unit 153, and a provision unit 154, and achieves or executes functions or effects of the information processing described below. Note that an internal configuration of the control unit 15 is not limited to the configuration illustrated in FIG. 4, and may be another configuration if the information processing described below is performed. In addition, a connection relationship between respective processing units included in the control unit 15 is not limited to the connection relationship illustrated in FIG. 4, and may be another connection relationship.

Obtaining Unit 151

The obtaining unit 151 obtains various types of information. For example, the obtaining unit 151 obtains various types of information from an external information processing device. The obtaining unit 151 receives various types of information from the search server 50. For example, the obtaining unit 151 obtains various types of information from the storage unit 14. The obtaining unit 151 obtains various types of information from the model information storage unit 141. For example, the obtaining unit 151 may obtain an image captured by the sensor unit 16, as a base image.

The obtaining unit 151 obtains a base image serving as an image including a transaction target specified by a user. The obtaining unit 151 obtains, from the search server 50, a search result based on an edited illustration image. The obtaining unit 151 obtains a base image of a transaction target having a color specified by a user. The obtaining unit 151 obtains a base image of a transaction target having a shape specified by a user. The obtaining unit 151 obtains a base image of a transaction target having a pattern specified by a user. The obtaining unit 151 obtains a base image that corresponds to a transaction target serving as a product specified by a user. The obtaining unit 151 obtains, from the search server 50, a search result indicating a similar transaction target that is similar to an illustration-prepared transaction target.

Generation Unit 152

The generation unit 152 performs various types of generation. The generation unit 152 generates an illustration image. The generation unit 152 generates an illustration image by using information stored in the storage unit 14. The generation unit 152 generates an illustration image by using the generation model M1 stored in the model information storage unit 141.

The generation unit 152 generates an illustration image from a base image. The generation unit 152 generates an illustration image in which the style of a base image has been changed. The generation unit 152 generates an illustration image that is a line drawing obtained by removing color from a base image. The generation unit 152 generates an illustration image in which a first color of a base image has been changed to a second color.

Reception Unit 153

The reception unit 153 receives various types of information. The reception unit 153 receives various operations performed by a user. For example, the reception unit 153 receives various operations performed by a user by using the input unit 12.

The reception unit 153 receives editing performed by a user on an illustration image including an illustration-prepared transaction target obtained by preparing an illustration of a transaction target included in a base image. The reception unit 153 receives a change in color performed by a user on an illustration-prepared transaction target. The reception unit 153 receives a change in a shape performed by a user on an illustration-prepared transaction target. The reception unit 153 receives a change in a pattern performed by a user on an illustration-prepared transaction target. The reception unit 153 receives editing performed by a user on an illustration image generated by the generation unit 152.

Provision Unit 154

The provision unit 154 transmits various types of information to an external information processing device via the communication unit 11. The provision unit 154 transmits various types of information to the search server 50. The provision unit 154 transmits various types of information stored in the storage unit 14 to an external information processing device. The provision unit 154 transmits various types of information obtained by the obtaining unit 151 to an external information processing device.

The provision unit 154 provides an edited illustration image serving as an illustration image edited by a user to the search server 50 that conducts an image search. The provision unit 154 provides the search server 50 with an edited illustration image in which the color of an illustration-prepared transaction target has been changed by a user. The provision unit 154 provides the search server 50 with an edited illustration image in which the shape of an illustration-prepared transaction target has been changed by a user. The provision unit 154 provides the search server 50 with an edited illustration image in which the pattern of an illustration-prepared transaction target has been changed by a user.

Note that various types of processing performed by the control unit 15 described above may be implemented, for example, by JavaScript (registered trademark) or the like. In addition, in a case where processing, such as information processing, that is performed by the control unit 15 described above is performed by using a predetermined application, each unit of the control unit 15 may be implemented, for example, by a predetermined application. For example, processing, such as information processing, that is performed by the control unit 15 may be implemented by control information that has been received from an external information processing device.

Sensor Unit 16

The sensor unit 16 senses predetermined information. Note that the sensor unit 16 may include a variety of sensors that sense information to be used in information processing.

For example, the sensor unit 16 includes a sensor that senses various types of information relating to an operation performed by a user on the terminal device 10. For example, the sensor unit 16 includes a pressure sensor. For example, the sensor unit 16 includes a sensor that senses pressure information indicating a pressure at which a user comes into contact with a screen. For example, the sensor unit 16 includes a sensor that senses a contact range (coordinates) of a user on a screen. For example, the sensor unit 16 includes a sensor that senses positional information indicating a position where a user is in contact with a screen. For example, the sensor unit 16 includes a sensor that senses area information indicating area in which a user is in contact with a screen.

For example, in a case where an image captured by using a camera function is used as a base image, the sensor unit 16 may include a camera (an image sensor). For example, the sensor unit 16 includes an image sensor in order to image a transaction target that a user desires to search for.

In addition, the sensor unit 16 is not limited to the above, and may include a variety of sensors. For example, the sensor unit 16 may include a sensor that senses information outside the terminal device 10.

The sensor unit 16 includes a sensor (a position sensor) that senses a position of the terminal device 10. For example, the sensor unit 16 may include a global positioning system (GPS) sensor. In addition, in a case where the positional information of the terminal device 10 is obtained as sensor information, the sensor unit 16 may obtain positional information of a base station that performs communication, or positional information of the terminal device 10 that has been estimated by using radio waves of wireless fidelity (WiFi) (registered trademark).

Note that sensors that sense the various types of information described above in the sensor unit 16 may be a common sensor, or may be implemented by respective different sensors.

3. Flow of Information Processing

Next, a procedure of information processing according to an embodiment is described with reference to FIG. 6. FIG. 6 is a flowchart illustrating an example of information processing according to an embodiment.

As illustrated in FIG. 6, the terminal device 10 obtains a base image serving as an image including a transaction target specified by a user (Step S101). For example, the terminal device 10 transmits, to the search server 50, information indication a transaction target specified by a user, and obtains, from the search server 50, a base image including the transaction target.

Then, the terminal device 10 receives editing performed by the user on an illustration image including an illustration-prepared transaction target obtained by preparing an illustration of the transaction target included in the base image (Step S102). For example, the terminal device 10 receives editing performed by the user for changing at least one of color, a shape, and a pattern of the illustration-prepared transaction target in the illustration image.

Then, the terminal device 10 provides an edited illustration image serving as an illustration image edited by the user to a search server that conducts an image search (Step S103). For example, the terminal device 10 transmits, to the search server 50, an edited illustration image edited by the user. Thereafter, the terminal device 10 receives, from the search server 50, a result of a search using the edited illustration image.

4. Effects

As described above, an information processing device according to an embodiment (in the embodiment, a "terminal device 10"; hereinafter, the similar is applied) includes an obtaining unit (in the embodiment, an "obtaining unit 151"; hereinafter, the similar is applied), a reception unit (in the embodiment, a "reception unit 153"; hereinafter, the similar is applied), and a provision unit (in the embodiment, a "provision unit 154"; hereinafter, the similar is applied). The obtaining unit obtains a base image that is an image including a transaction target specified by a user. In addition, the reception unit receives editing performed by a user on an illustration image including an illustration-prepared transaction target obtained by preparing an illustration of the transaction target included in the base image. In addition, the provision unit provides an edited illustration image serving as an illustration image edited by the user to a search server that conducts an image search.

As described above, in the information processing device according to the embodiment, an illustration of a base image including a transaction target is prepared, editing performed by a user on an illustration image including an illustration-prepared transaction target is received, and an edited illustration image after editing performed by the user is provided to a search server that conducts an image search, and therefore, an image is provided in an aspect in which the user can easily perform editing. A search is conducted on the basis of an image in which a result of editing performed by the user has been reflected, and this can facilitate a search desired by the user.

In addition, in the information processing device according to the embodiment, the obtaining unit obtains, from a search server, a search result based on an edited illustration image.

As described above, the information processing device according to the embodiment obtains, from the search server, a search result based on an edited illustration image, and therefore a search result desired by a user can be provided to the user.

In addition, in the information processing device according to the embodiment, the obtaining unit obtains, from the search server, a search result indicating a similar transaction target that is similar to the illustration-prepared transaction target.

As described above, the information processing device according to the embodiment obtains, from the search server, a similar transaction target that is similar to an illustration-prepared transaction target included in the edited illustration image, and therefore a search result desired by a user can be provided to the user.

In addition, in the information processing device according to the embodiment, the reception unit receives a change in color performed by a user on an illustration-prepared transaction target. The provision unit provides the search server with an edited illustration image in which the color of the illustration-prepared transaction target has been changed by the user.

As described above, the information processing device according to the embodiment receives a change in color performed by a user on an illustration-prepared transaction target, and provides the search server with an edited illustration image in which color has been changed, and therefore a search is conducted on the basis of an image in which a result of editing performed by the user with respect to color has been reflected. This can facilitate a search desired by the user.

In addition, in the information processing device according to the embodiment, the reception unit receives a change in a shape performed by a user on an illustration-prepared transaction target. The provision unit provides the search server with an edited illustration image in which the shape of the illustration-prepared transaction target has been changed by the user.

As described above, the information processing device according to the embodiment receives a change in a shape performed by a user on an illustration-prepared transaction target, and provides the search server with an edited illustration image in which a shape has been changed, and therefore a search is conducted on the basis of an image in which a result of editing performed by the user with respect to a shape has been reflected. This can facilitate a search desired by the user.

In addition, in the information processing device according to the embodiment, the reception unit receives a change in a pattern performed by a user on an illustration-prepared transaction target. The provision unit provides the search server with an edited illustration image in which the pattern of then illustration-prepared transaction target has been changed by the user.

As described above, the information processing device according to the embodiment receives a change in a pattern performed by a user on an illustration-prepared transaction target, and provides the search server with an edited illustration image in which a pattern has been changed, and therefore a search is conducted on the basis of an image in which a result of editing performed by the user with respect to a pattern has been reflected. This can facilitate a search desired by the user.

In addition, in the information processing device according to the embodiment, the obtaining unit obtains a base image of a transaction target having a color specified by a user.

As described above, the information processing device according to the embodiment receives editing performed by a user on an illustration image based on a base image of a transaction target having a color specified by the user. Therefore, a burden of editing relating to color is reduced, and this can facilitate editing to be performed by the user. A search result desired by the user can be provided to the user.

In addition, in the information processing device according to the embodiment, the obtaining unit obtains a base image of a transaction target having a shape specified by a user.

As described above, the information processing device according to the embodiment receives editing performed by a user on an illustration image based on a base image of a transaction target having a shape specified by the user. Therefore, a burden of editing relating to a shape is reduced, and this can facilitate editing to be performed by the user. A search result desired by the user can be provided to the user.

In addition, in the information processing device according to the embodiment, the obtaining unit obtains a base image of a transaction target having a pattern specified by a user.

As described above, the information processing device according to the embodiment receives editing performed by a user on an illustration image based on a base image of a transaction target having a pattern specified by the user. Therefore, a burden of editing relating to a pattern is reduced, and this can facilitate editing to be performed by the user. A search result desired by the user can be provided to the user.

In addition, in the information processing device according to the embodiment, the obtaining unit obtains a base image that corresponds to a transaction target serving as a product specified by a user.

As described above, in the information processing device according to the embodiment, an illustration of a base image including a product is prepared, editing performed by a user on an illustration image including an illustration-prepared product is received, and an edited illustration image after editing performed by a user is provided to a search server that conducts an image search, and therefore, an image is provided in an aspect in which the user can easily perform editing. A search is conducted on the basis of an image in which a result of editing performed by the user has been reflected, and this can facilitate a product search desired by the user.

The information processing device according to the embodiment includes a generation unit (in the embodiment, a "generation unit 152"; hereinafter the similar is applied). The generation unit generates an illustration image from a base image. In addition, the reception unit receives editing performed by a user on the illustration image generated by the generation unit.

As described above, the information processing device according to the embodiment generates an illustration image from a base image, and therefore the information processing device can receive editing performed by a user on the generated illustration image. This can facilitate a search desired by the user.

In addition, in the information processing device according to the embodiment, the generation unit generates an illustration image in which a style of a base image has been changed.

As described above, the information processing device according to the embodiment generates an illustration image in which a style of a base image has been changed, and therefore the information processing device can receive editing performed by a user on the generated illustration image. This can facilitate a search desired by the user.

In addition, in the information processing device according to the embodiment, the generation unit generates an illustration image that is a line drawing obtained by removing color from a base image.

As described above, the information processing device according to the embodiment generates an illustration image obtained by removing color from a base image, and therefore the information processing device can receive editing performed by a user on the generated illustration image. This can facilitate a search desired by the user.

In addition, in the information processing device according to the embodiment, the generation unit generates an illustration image in which a first color of a base image has been changed into a second color.

As described above, the information processing device according to the embodiment generates an illustration image obtained by changing the color of a base image, and therefore the information processing device can receive editing performed by a user on the generated illustration image. This can facilitate a search desired by the user.

5. Program

Processing performed by the terminal device 10 described above is implemented by an information processing program according to the present application. For example, a CPU, an MPU, or the like included in the terminal device 10 executes a processing procedure according to the information processing program using an RAM as a work area, and therefore the generation unit 152 of the terminal device 10 is implemented. For example, the CPU, the MPU, or the like included in the terminal device 10 executes an information processing procedure relating to optimization of reception processing or the like for receiving editing performed by a user on an illustration image according to the information processing program using the RAM as a work area, and therefore the generation unit 152 of the terminal device 10 is implemented. Respective procedures according to the information processing program are performed, and therefore another unit of the terminal device 10 is similarly implemented. For example, the information processing program may be included in an application or the like that provides a search service.

Note that not the entirety of processing performed by the terminal device 10 according to the present application is implemented by the information processing program. For example, the sensor unit 16 senses various types of sensor information in the terminal device 10. At this time, various types of sensor information or the like in the terminal device 10 may be sensed by an operating system (OS) included in the terminal device 10. In other words, the information processing program itself does not perform processing to be performed by the terminal device 10, as described above, but data that has been obtained by the OS (for example, data obtained by using a sensor, a circuit, or the like included in the terminal device 10) may be received or sensed, and therefore the processing described above of the terminal device 10 may be implemented. In addition, the information processing program may be included in the OS included in the terminal device 10.

6. Hardware Configuration

Figure 7:
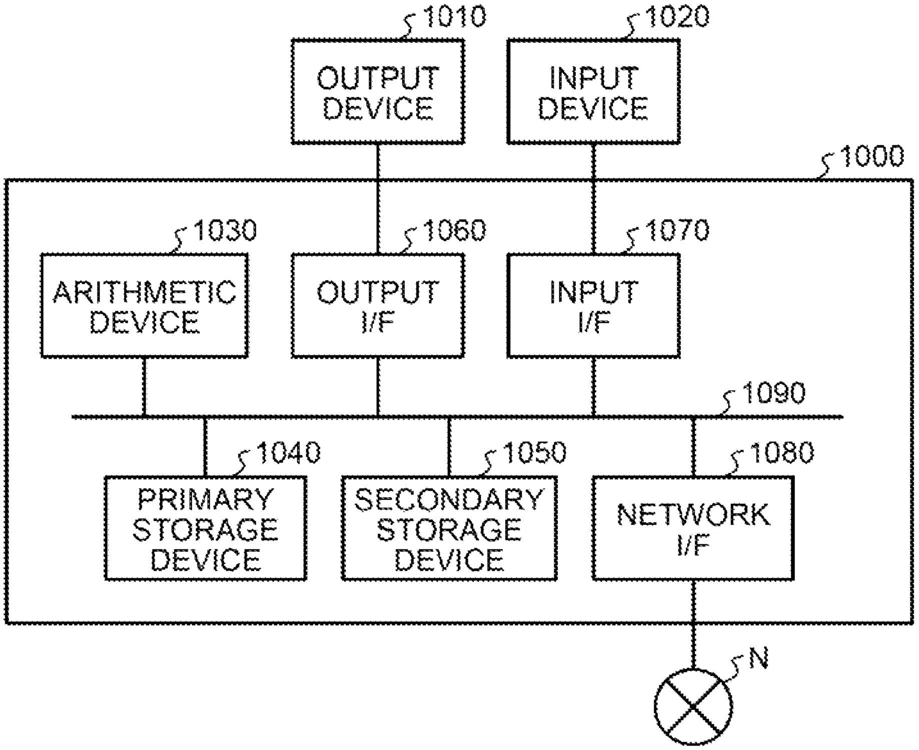
FIG. 7 is a diagram illustrating an example of a hardware configuration.

In addition, the terminal device 10 according to the embodiment described above is implemented by a computer 1000 having, for example, the configuration illustrated in FIG. 7. FIG. 7 is a diagram illustrating an example of a hardware configuration. The computer 1000 is connected to an output device 1010 and an input device 1020, and has a form in which an arithmetic device 1030, a primary storage device 1040, a secondary storage device 1050, an output interface (I/F) 1060, an input I/F 1070, and a network I/F 1080 are connected by a bus 1090.

The arithmetic device 1030 operates according to a program stored in the primary storage device 1040 or the secondary storage device 1050, a program read from the input device 1020, or the like, and performs various types of processing. The arithmetic device 1030 is implemented, for example, by a central processing unit (CPU), a micro processing unit (MPU), an application specific integrated circuit (ASIC), a field programmable gate array (FPGA), or the like.

The primary storage device 1040 is a memory device that primarily stores data to be used by the arithmetic device 1030 in various arithmetic operations, such as a random access memory (RAM). In addition, the secondary storage device 1050 is a storage device in which data to be used by the arithmetic device 1030 in various arithmetic operations or various databases are registered, and is implemented by a read only memory (ROM), a hard disk drive (HDD), a solid state drive (SSD), a flash memory, or the like. The secondary storage device 1050 may be a built-in storage, or may be an external storage. In addition, the secondary storage device 1050 may be a removable storage medium such as a USB memory or a secure digital (SD) memory card. Further, the secondary storage device 1050 may be a cloud storage (an online storage), a network attached storage (NAS), a file server, or the like.

The output I/F 1060 is an interface for transmitting information serving as an output target to the output device 1010 that outputs various types of information, such as a display, a projector, or a printer, and is implemented, for example, by a connector of a standard such as universal serial bus (USB), digital visual interface (DVI), or high definition multimedia interface (HDMI) (registered trademark). In addition, the input I/F 1070 is an interface for receiving information from various input devices 1020 such as a mouse, a keyboard, a keypad, a button, or scanner, and is implemented, for example, by the USB or the like.

Further, the output I/F 1060 and the input I/F 1070 may be wirelessly connected to the output device 1010 and the input device 1020, respectively. In other words, the output device 1010 and the input device 1020 may be wireless equipment.

In addition, the output device 1010 and the input device 1020 may be integrated similarly to a touch panel. In this case, the output I/F 1060 and the input I/F 1070 may also be integrated as an input/output I/F.

Note that the input device 1020 may be, for example, a device that reads information from an optical recording medium such as a compact disc (CD), a digital versatile disc (DVD), or a phase change rewritable disk (PD), a magneto-optical recording medium such as a magneto-optical disk (MO), a tape medium, a magnetic recording medium, a semiconductor memory, or the like.

The network I/F 1080 receives data from another device via a network N and transmits the data to the arithmetic device 1030, or transmits data that has been generated by the arithmetic device 1030 via the network N to another device.

The arithmetic device 1030 controls the output device 1010 or the input device 1020 via the output I/F 1060 or the input I/F 1070. For example, the arithmetic device 1030 loads a program from the input device 1020 or the secondary storage device 1050 into the primary storage device 1040, and executes the loaded program.

For example, in a case where the computer 1000 functions as the terminal device 10, the arithmetic device 1030 of the computer 1000 executes a program that has been loaded into the primary storage device 1040, and therefore a function of the control unit 15 is achieved. In addition, the arithmetic device 1030 of the computer 1000 may load, into the primary storage device 1040, a program that has been obtained from another device via the network I/F 1080, and may execute the loaded program. Further, the arithmetic device 1030 of the computer 1000 may cooperate with other equipment via the network I/F 1080, and may call functions of a program, data, or the like from another program of the other equipment and may use the functions of the program, the data, or the like.

Some of the embodiments and variations of the present application have been described above in detail with reference to the drawings. However, these are examples, and the present invention can be embodied in the aspects described in lines of the disclosure of the invention and other aspects that have undergone various variations or modifications on the basis of knowledge of those skilled in the art.

7. Others

In addition, from among respective pieces of processing described in each of the embodiments and variations described above, the entirety or part of processing that has been described to be automatically performed can be manually performed. Alternatively, the entirety or part of processing that has been described to be manually performed can be automatically performed according to a publicly known method. In addition, processing procedures, specific names, various types of data, and information including a parameter that have been described in the document described above or have been illustrated in the drawings can be arbitrarily changed unless otherwise specified. For example, various types of information illustrated in each of the drawings are not limited to illustrated information.

In addition, each component of each illustrated device is functionally conceptual, and does not always need to be physically configured as illustrated. In other words, a specific distributed or integrated form of each of the devices is not limited to the illustrated form, and all or some of the respective devices can be configured to be functionally or physically distributed or integrated in an arbitrary unit in accordance with various loads, use situations, or the like.

In addition, the respective embodiments and variations described above can be appropriately combined without contradicting the content of processing.

Further, a "section", "module", or "unit" described above can be replaced with "means", a "circuit", or the like. For example, the obtaining unit can be replaced with obtaining means or an obtaining circuit.

In an aspect of an embodiment, an effect by which information desired by a user can be provided is exhibited.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising: a processor, wherein the processor is configured to:
- obtain a base image, the base image being a photograph that includes a transaction target specified by a user;
- generate an illustration image from the base image using a machine-learning model, wherein the machine-learning model is learned using a convolution neural network (CNN) and the illustration image includes an illustration-prepared transaction target, wherein the machine-learning model comprises a generation model that outputs the illustration image from the base image;
- receive editing performed by the user on the illustration-prepared transaction target and analyze the editing to determine user emphasis on specific features of the transaction target; and
- perform inverse conversion on an edited illustration image to generate a converted image using the CNN, the converted image being a photographic image converted from the edited illustration image;
- provide the converted image to a search server that conducts an image search, wherein the generation model performs a forward domain transformation from a photographic domain to an illustration domain to produce the illustration image,
- wherein the inverse conversion performs a reverse domain transformation from the illustration domain back to the photographic domain to produce the converted image,
- wherein the search server conducts the image search by comparing the converted image against a photographic image index comprising registered images of transaction targets, and
- wherein the edited illustration image is the illustration image that has been edited by the user.

2. The information processing device according to claim 1, wherein the processor is further configured to:
- obtain, from the search server, a search result based on the edited illustration image.

3. The information processing device according to claim 2, wherein the processor is further configured to:
- obtain, from the search server, the search result indicating a similar transaction target that is similar to the illustration-prepared transaction target.

4. The information processing device according to claim 1, wherein the processor is further configured to:
- receive a change in color that has been performed by the user on the illustration-prepared transaction target, and
- provide the search server with the edited illustration image in which the color of the illustration-prepared transaction target has been changed by the user.

5. The information processing device according to claim 1, wherein the processor is further configured to:
- receive a change in a shape that has been performed by the user on the illustration-prepared transaction target, and
- provide the search server with the edited illustration image in which the shape of the illustration-prepared transaction target has been changed by the user.

6. The information processing device according to claim 1, wherein the processor is further configured to:
- receive a change in a pattern that has been performed by the user on the illustration-prepared transaction target, and
- provide the search server with the edited illustration image in which the pattern of the illustration-prepared transaction target has been changed by the user.

7. The information processing device according to claim 1, wherein the processor is further configured to:
- obtain the base image of the transaction target having a color specified by the user.

8. The information processing device according to claim 1, wherein the processor is further configured to:
- obtain the base image of the transaction target having a shape specified by the user.

9. The information processing device according to claim 1, wherein the processor is further configured to:
- obtain the base image of the transaction target having a pattern specified by the user.

10. The information processing device according to claim 1, wherein the base image corresponds to a product specified by the user.

11. The information processing device according to claim 1, wherein the processor is further configured to: generate the illustration image in which a style of the base image has been changed.

12. The information processing device according to claim 1, wherein the illustration image is a line drawing obtained by removing color from the base image.

13. The information processing device according to claim 1, wherein the processor is further configured to: generate the illustration image in which a first color of the base image has been changed into a second color.

14. An information processing method performed by a computer, the information processing method comprising:
- an obtaining process of obtaining a plurality of base images, each of the plurality of base images includes an element of a transaction target specified by a user;
- a generating process of generating an illustration image from the plurality of base images using a machine-learning model, wherein the machine-learning model is learned using a convolution neural network (CNN) and the illustration image includes an illustration-prepared transaction target with elements of the plurality of base images, wherein the machine-learning model comprises a generation model that outputs the illustration image from the base image;
- a reception process of receiving editing performed by the user on the illustration-prepared transaction target and analyzing the editing to determine user emphasis on specific features of the transaction target; and
- a conversion process of performing inverse conversion on an edited illustration image to generate a converted image using the CNN, the converted image being a photographic image converted from the edited illustration image;
- a provision process of providing the converted image to a search server that conducts an image search,
- wherein the generation model performs a forward domain transformation from a photographic domain to an illustration domain to produce the illustration image, wherein the inverse conversion performs a reverse domain transformation from the illustration domain back to the photographic domain to produce the converted image, wherein the search server conducts the image search by comparing the converted image against a photographic image index comprising registered images of transaction targets, and wherein the edited illustration image is the illustration image that has been edited by the user.

15. A non-transitory computer readable storage medium having stored an information processing program that causes a computer to execute:

an obtaining procedure of obtaining a base image, the base image being a photograph that includes a transaction target specified by a user;

a generating procedure of generating an illustration image from the base image using a machine-learning model, wherein the machine-learning model is learned using a Cycle Generative Adversarial Network (CycleGAN) and the illustration image comprises a line drawing of the transaction target with color automatically removed without user input, wherein the machine-learning model comprises a generation model that outputs the illustration image from the base image;

a reception procedure of receiving editing performed by the user on the illustration image;

a conversion procedure of performing inverse conversion on an edited illustration image to generate a converted image using the CycleGAN, the converted image being a photographic image converted from the edited illustration image;

a provision procedure of providing the converted image to a search server that conducts an image search to identify one or more transaction targets, wherein the generation model performs a forward domain transformation from a photographic domain to an illustration domain to produce the illustration image comprising the line drawing, wherein the inverse conversion using the CycleGAN performs a reverse domain transformation from the illustration domain back to the photographic domain to produce the converted image, and wherein the search server conducts the image search by comparing the converted image against a photographic image index comprising registered images of transaction targets; and a generation process of generating rankings that correspond to price or selling history of the transaction targets by the search server.

* * * * *